(12) United States Patent
Yudanov (10) Patent No.: US 8,434,459 B2
(45) Date of Patent: May 7, 2013

(54) FUEL INJECTION SYSTEM

(75) Inventor: Sergi Yudanov, V. Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 342 days.

(21) Appl. No.: 12/920,326

(22) PCT Filed: Mar. 4, 2008

(86) PCT No.: PCT/SE2008/000176
§ 371 (c)(1),
(2), (4) Date: Aug. 31, 2010

(87) PCT Pub. No.: WO2009/110820
PCT Pub. Date: Sep. 11, 2009

(65) Prior Publication Data
US 2011/0005494 A1  Jan. 13, 2011

(51) Int. Cl.
*F02M 37/00* (2006.01)
*F02M 37/04* (2006.01)
(52) U.S. Cl.
USPC .......................................... 123/514; 123/456
(58) Field of Classification Search .................. 123/456, 123/506, 510, 514, 461, 457, 459, 447, 446; 239/88–92
See application file for complete search history.

(56) References Cited

U.S. PATENT DOCUMENTS

| | | | |
|---|---|---|---|
| 5,058,614 A * | 10/1991 | Plohberger et al. | 137/1 |
| 6,189,517 B1 | 2/2001 | McCandless | |
| 6,994,272 B2 | 2/2006 | Kurrle et al. | |
| 2004/0069276 A1 * | 4/2004 | Parche | 123/446 |
| 2004/0255908 A1 * | 12/2004 | Udd et al. | 123/446 |
| 2006/0065241 A1 * | 3/2006 | Yamamoto | 123/446 |
| 2008/0202471 A1 * | 8/2008 | Yudanov | 123/446 |

FOREIGN PATENT DOCUMENTS

WO  2007114750 A1  10/2007

OTHER PUBLICATIONS

International Search Report for corresponding International Application PCT/SE2008/000176.

* cited by examiner

*Primary Examiner* — Mahmoud Gimie
(74) *Attorney, Agent, or Firm* — WRB-IP LLP (57) ABSTRACT

A fuel injection system for an internal combustion engine includes an engine management system (EMS), a return line connected to a low-pressure fuel system, a common rail for storing and supplying a relatively high-pressure fuel to an injector, and an automatic isolating valve installed between the common rail and the injector. The injector has a nozzle for injecting fuel into the engine. A valve is operated by the EMS and installed between the common rail and the nozzle. A spill valve is operated by the EMS and connected by its inlet to the outlet of the valve and by its outlet to the return line. A check valve is installed between the nozzle and the return line, the inlet of the check valve being connected to the inlet of the nozzle.

18 Claims, 8 Drawing Sheets

FUEL INJECTION SYSTEM

BACKGROUND AND SUMMARY

The present invention relates to a fuel injection system for an internal combustion engine and a vehicle.

Fuel injection systems of internal combustion engines, in particular systems for injection of fuel directly into combustion cylinders of compression ignition engines, may be featuring a control valve for pressure relief from a nozzle of an injector for injecting fuel into a combustion chamber of the internal combustion engine. Such solutions are typically applied in common rail injection systems for preventing a leakage of fuel through a closed nozzle, which is otherwise difficult to avoid when using low viscosity fuels such as DME.

Figure 1:
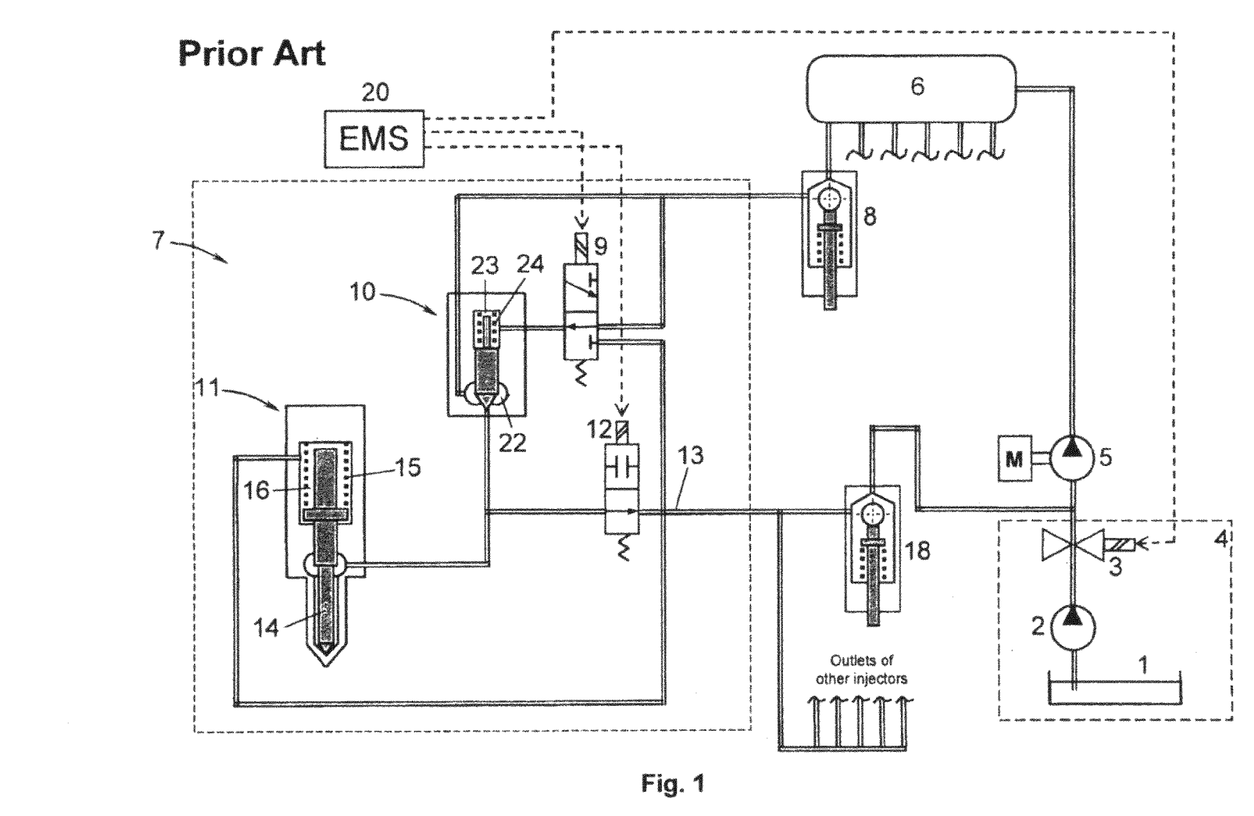
FIG. 1 shows a schematic illustration of an example embodiment of a fuel injection system according to prior art.

An example of such a system known from prior art is shown in FIG. 1. In that system, designed for operation with DME, there are automatic isolating valves (AIV) employed for preventing leakage of fuel from the fuel supply system through closed nozzles into engine's cylinders when the engine is stopped. These automatic isolating valves are referenced to ambient pressure and are designed to be open when the fuel feed pump is ON and the pressure at the return line of the injectors is higher than DME vapour pressure, and to be closed to prevent access of DME to injectors when the feed pump is OFF. The description of a typical AIV is given, for example, in U.S. Pat. No. 6,189,517 B1. One of the AIVs is placed at the high-pressure port of each of the injectors. The return lines of the injectors are connected together and a common low-pressure AIV is placed downstream of that connection. By this means, the number of low-pressure AIVs is kept to a minimum to make the fuel injection system simpler. It is also known from prior art to position the high-pressure AIV directly upstream of the nozzle, but that design leads to increased control leakage and worse injection controllability at small injected quantities because of the associated volume increase in the high-pressure circuit that is drained between injections. Consequently, the prior art system shown in FIG. 1 offers improved injection controllability at smaller control leakage and is relatively simple due to the total number of AIVs per engine being equal to the number of injectors plus one.

However, in that prior art system, the total volume of fuel confined between the nozzle and the AIVs can be relatively large, depending on the particular design of the injector. It is known, for example, to utilise the entire inter-injector volume as part of the return line in order to simplify design and port interfaces of constituent components. In that case, the total volume of fuel that may escape through the nozzle into engine's combustion chamber when the engine is stopped could be large enough to cause engine startability problems, such as cylinder overpressure at the first ignition. This would also increase total fuel consumption and emission of unburnt hydrocarbons.

The use of automatic isolating valves increases the cost and complexity of a fuel injection system, because, as a reference to a third pressure is necessary for such a valve to operate, appropriate flow path for that extra pressure must be provided as well as extra sealing.

It is desirable to provide a fuel injection system that ensures a better engine startability and reduced fuel leakage whilst the cost and complexity of the system are kept to a minimum.

According to a first aspect of the invention there is provided a fuel injection system for an internal combustion engine, incorporating an engine management system (EMS) 20, a return line 13 connected to a low-pressure fuel system 4, a common rail 6 for storing and supplying a relatively high-pressure fuel to an injector 7, and an automatic isolating valve 8 installed between the common rail 6 and the injector 7. Said injector has a nozzle 11 for injecting fuel into the engine. A valve 10 operated by the EMS 20 is installed between the common rail 6 and the nozzle 11. A spill valve 12 operated by the EMS 20 is connected by its inlet to an outlet of the valve 10 and by its outlet to the return line 13. A check valve 25 is provided between the nozzle 11 and the return line 13, with the inlet of said check valve being connected to the inlet of the nozzle 11.

In other example embodiments said check valve 25 may be connected by its inlet to the outlet of the spill valve 12. The valve 10 may be electrically operated by the EMS 20. The valve 10 may be controlled by an electrically operated pilot valve 9. The outlet of said pilot valve 9 may be connected to the outlet of said spill valve 12. The valve 10 may be controlled by an electrically operated pilot valve 9; the outlet of said pilot valve 9 may be connected to the outlet of said check valve 25.

According to another aspect of the present invention there is provided a fuel injection system for an internal combustion engine, incorporating an engine management system (EMS) 20, a return line 13 connected to a low-pressure fuel system 4, a common rail 6 for storing and supplying a relatively high-pressure fuel to an injector 7, an automatic isolating valve 8 installed between the common rail 6 and the injector 7, and a nozzle 11 for injecting fuel into the engine. A valve 10 is installed between the common rail 6 and the nozzle 11 and controlled by an electrically operated pilot valve 9. An electrically operated spill valve 12 is connected by its inlet to the outlet of the valve 10 and by its outlet to the return line 13. The outlet of said pilot valve 9 is connected to the outlet of said valve 10.

According to yet another aspect of the invention there is provided a vehicle comprising a fuel injection system as disclosed above.

BRIEF DESCRIPTION OF THE DRAWINGS

With reference to the appended drawings below follows a more detailed description of embodiments of the invention cited as examples.

In the drawings.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 2:
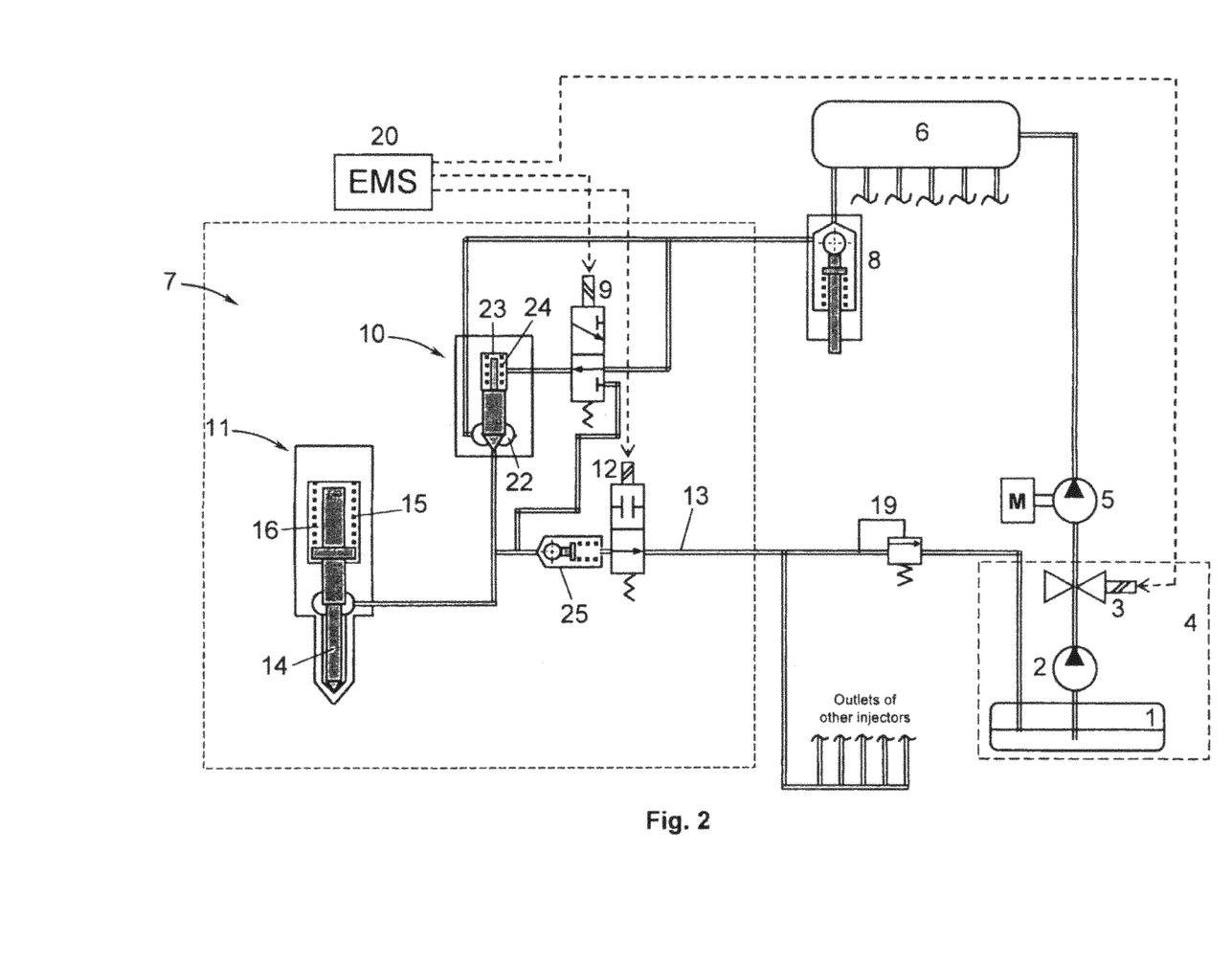
FIG. 2 shows a schematic illustration of a first example embodiment of a fuel injection system according to the present invention.

In an example embodiment shown in FIG. 2, a fuel injection system according to present invention incorporates a fuel tank 1, a feed pump 2, an isolating valve 3 and other associated components (not shown) forming a low-pressure system 4, and a high-pressure pump 5 delivering fuel under pressure into a common rail 6, which supplies pressurised fuel to all injectors 7 of a multi-cylinder engine (not shown). An automatic isolating valve 8 is installed between the common rail 6 and the injector 7, which latter one incorporates a three-way electrically operated pilot valve 9 that controls a hydraulically operated valve 10 positioned between the common rail and a nozzle 11, and an electrically operated, two-way, normally open spill valve 12 positioned between the outlet of the hydraulically operated valve 10 and a return line 13. The nozzle 11 has a needle 14 that is biased by a return spring 15 towards closing the nozzle. The return spring is installed in a spring chamber 16 which, if pressurised, will assist the spring 15 in biasing the needle 14 towards nozzle closing. The outlet of the spill valve 12 is connected to the return line 13. The return lines of the injectors are connected to the low-pressure system via a pressure regulator 19. A check valve 25 is installed between the outlet of the hydraulically operated valve 10 and the spill valve 12 and is connected by its outlet to the inlet of the spill valve. The outlet of the pilot valve 9 is connected to the inlet of the check valve 25.

The hydraulically operated valve 10 preferably has a precision-matched pin and forms an outlet chamber 22 and a control chamber 23, and is preferably biased towards its closed position by a resilient means 24. The control chamber 23 of the valve 10 can be connected by the three-way pilot valve 9 to either the common rail 6 or the outlet of valve 10, depending on commands from the EMS 20. An engine management system (EMS) 20 controls the valves 9 and 12.

The automatic isolating valve 8 is designed such that, once the valve is open, the area of the valve that is exposed to the pressure of the fuel is sufficiently big to hold the valve open against the force of the valve's return spring when the pressure in the valve is anywhere from slightly below the feed pressure in the system or above that level. In case of engine being stopped and the feed pressure falling below a predetermined level, the automatic isolating valve closes and the area of the valve exposed to the pressure upstream, of the valve becomes relatively small, such that a pressure above the feed pressure level is required to re-open the automatic isolating valve. The design of such a valve is known in the art and is disclosed, for example, in the U.S. Pat. No. 6,189,517 B1.

Referring to FIG. 2, the fuel injection system according to the present invention works as follows: In a non-injecting state but with the engine running, the high-pressure pump pressurizes the fuel to a certain level and maintains that level in the common rail 6. The automatic isolating valve 8 is open; pressure upstream of nozzle 11 equals pressure in the return line 13 as set by the pressure regulator 19. That pressure typically exceeds fuel vapour pressure at temperatures to which, in use, the hottest injector volume is exposed, such that no vapour cavities form that can cause injection irregularity. The valves 9 and 12 are not activated by the EMS 20. The three-way pilot valve 9, in its de-activated position, connects the common rail 6 via open AIV 8 to the control chamber 23 of the hydraulically operated valve 10. The pressure from the common rail, combined with the force of the resilient means 24, holds the valve 10 in its closed position. The spill valve 12 is open, connecting the outlet of the check valve 25 to the return line 13 and the low pressure system 4 via the pressure regulator 19. The nozzle is closed by the needle return spring 15.

To begin an injection, the EMS applies control currents to the spill valve 12 closing it, and to the pilot valve 9, which disconnects the control chamber 23 of the hydraulically operated valve 10 from the common rail 6 and connects it to the inlet of check valve 25. The pressure in the control chamber 23 falls because the HOV 10 is still closed and the pressure downstream that valve is not, at that instant, higher than the relatively low residual pressure set by the regulator 19. That allows the common rail pressure, acting on the valve from the outlet chamber 22, to open the valve 10 against the force of the resilient means 24 and the falling pressure in its control chamber 23. The initial opening of HOV 10 admits fuel from the pressurised common rail 6 into the nozzle 11 and raises the pressure there above the nozzle opening pressure that is defined by the force of the nozzle return spring 15. The needle 14 opens the nozzle and fuel injection begins. The volume of the spring chamber 16 of the nozzle 11 is chosen to be large enough to allow full needle lift due to fuel compressibility. The flow through the nozzle out into the combustion chamber of the engine generates a pressure drop across the valve 10 and thus a positive difference between the pressure in the outlet chamber 22 and pressure in the control chamber 23, which fully opens valve 10 and keeps it open as long as the pilot valve 9 is energised.

To terminate the injection, the EMS de-activates the pilot valve 9, which then disconnects the control chamber 23 from the downstream of valve 10 and connects it back to the common rail 6. The pressure in the control chamber 23 rises and, together with the resilient means 24, forces the valve 10 down towards the closed position. During the closing period of valve 10 and corresponding reduction of its flow area, the fuel continues to be injected from the open nozzle and the pressure in the nozzle falls until the return spring 15 moves the needle 14 down and closes the nozzle. Then the EMS de-activates and opens the spill valve 12 to relieve the nozzle through the check valve 25 of the relatively high residual pressure which can otherwise leak past the closed nozzle into the engine. Thus pressure in the nozzle is brought down to the level set by the pressure regulator 19, and the system is returned to its initial position as depicted by FIG. 2.

Figure 3:
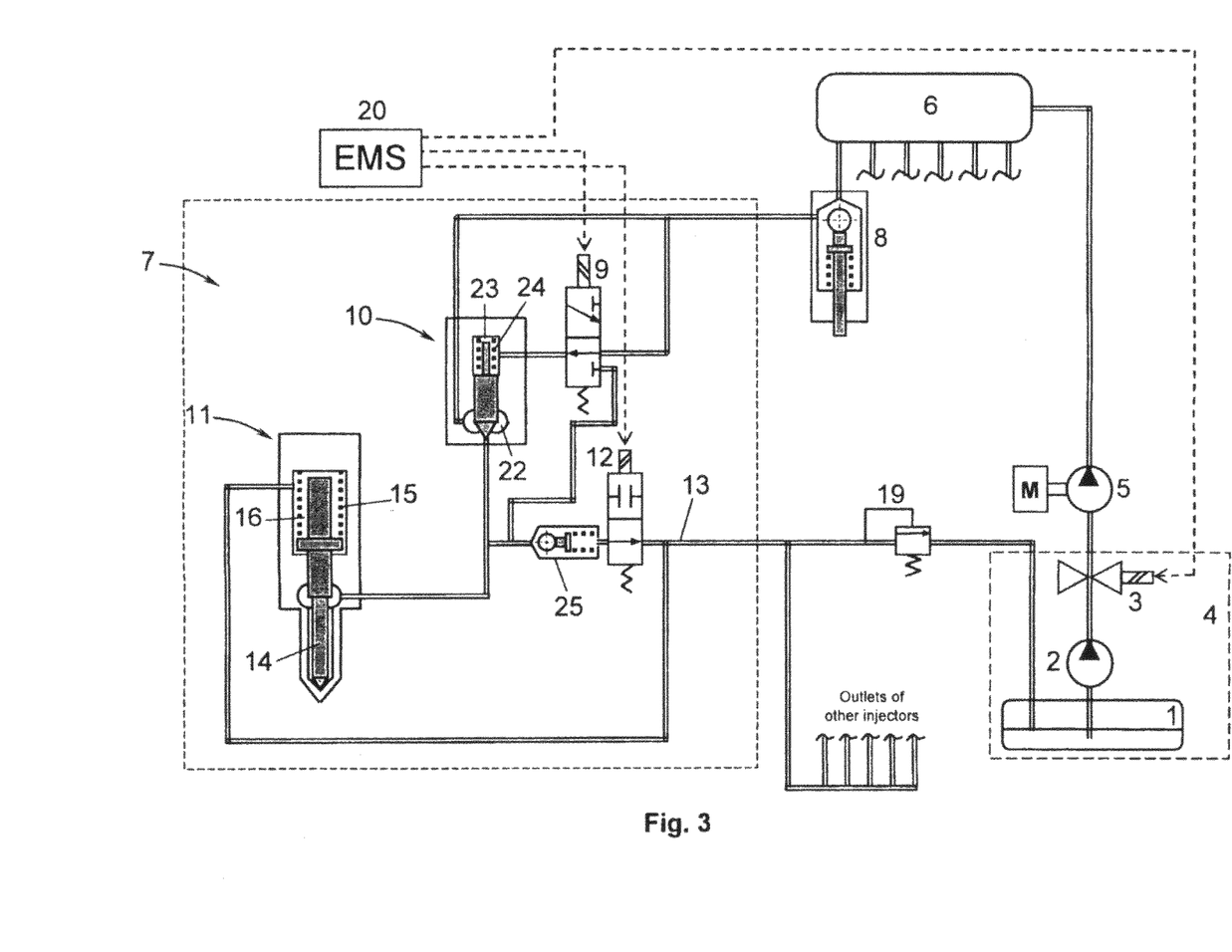
FIG. 3 shows a schematic illustration of a second example embodiment of a fuel injection system according to the present invention.

In an alternative embodiment of the invention shown in FIG. 3, the spring chamber 16 of the nozzle 11 is connected to the outlet of the spill valve 12. This allows reducing the volume of the spring chamber and thus the injector dimensions. It also can make the injector-to-injector performance more uniform because the spring chamber pressures will then not depend on the leakage through the needle/nozzle body guide, which varies with clearance and wear in the guide. In that embodiment, however, there is a path for leakage from the low-pressure system past the needle guide into the inlet of the nozzle 11, which, if the nozzle is not completely sealed in the needle seat, will allow a low-viscosity fuel to leak into the combustion chamber. Despite this, the leakage is not likely to be so significant as to cause engine startability problems, because the clearance in the needle/nozzle guide is very small. In case the fuel is DME, a very small leakage will not lead to collection of liquid fuel in the combustion chamber even if the engine is completely cooled down and the ambient temperature is very low. Even at −30° C. DME is a gas at ambient pressure, and crevices between engine's piston, piston rings and liner will, in case the DME leakage is small, prevent building the pressure up in the combustion chamber to the point when the fuel would liquefy. The gaseous fuel escaping through the crevices into the crankcase, can be let out to the ambient via a special venting duct, which can also be equipped with a fan and/or a valve capable of closing up the connection to ambient to allow closed crank case ventilation when the engine is running.

Figure 4:
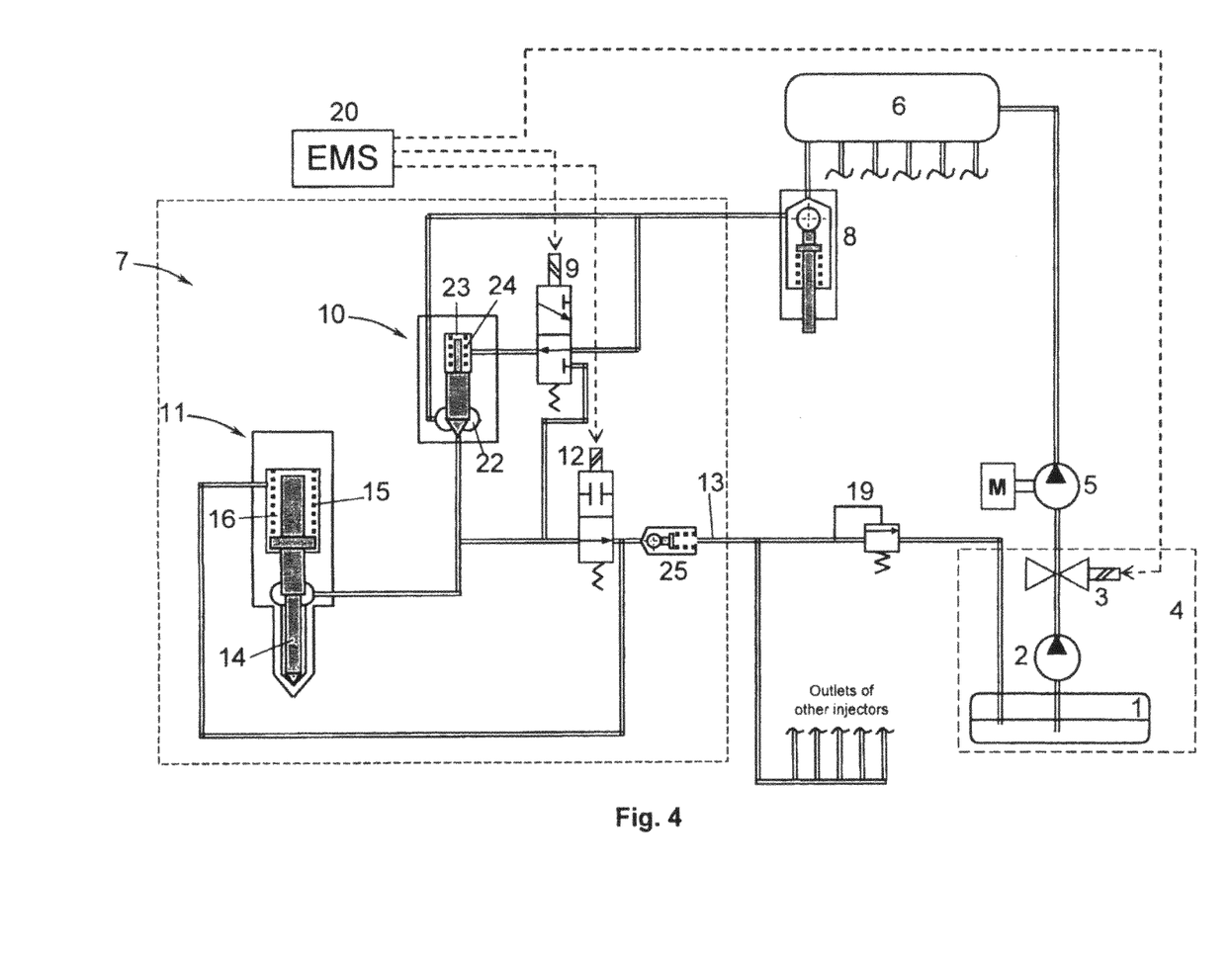
FIG. 4 shows a schematic illustration of a third example embodiment of a fuel injection system according to the present invention.

To further reduce the risk of DME leakage into combustion chamber, an alternative embodiment of the invention shown in FIG. 4 employs the check valve 25 connected downstream of the spill valve 12, with the spring chamber being fluidly connected to the inlet of the check valve. In that embodiment, the check valve also blocks the leakage path low-pressure system-spring chamber 16-nozzle guide-nozzle inlet-combustion chamber, but at the expense of an increased volume containing fuel and directly contributing to leakage due to decompression and/or gasification via the improperly sealed nozzle seat.

Figure 5:
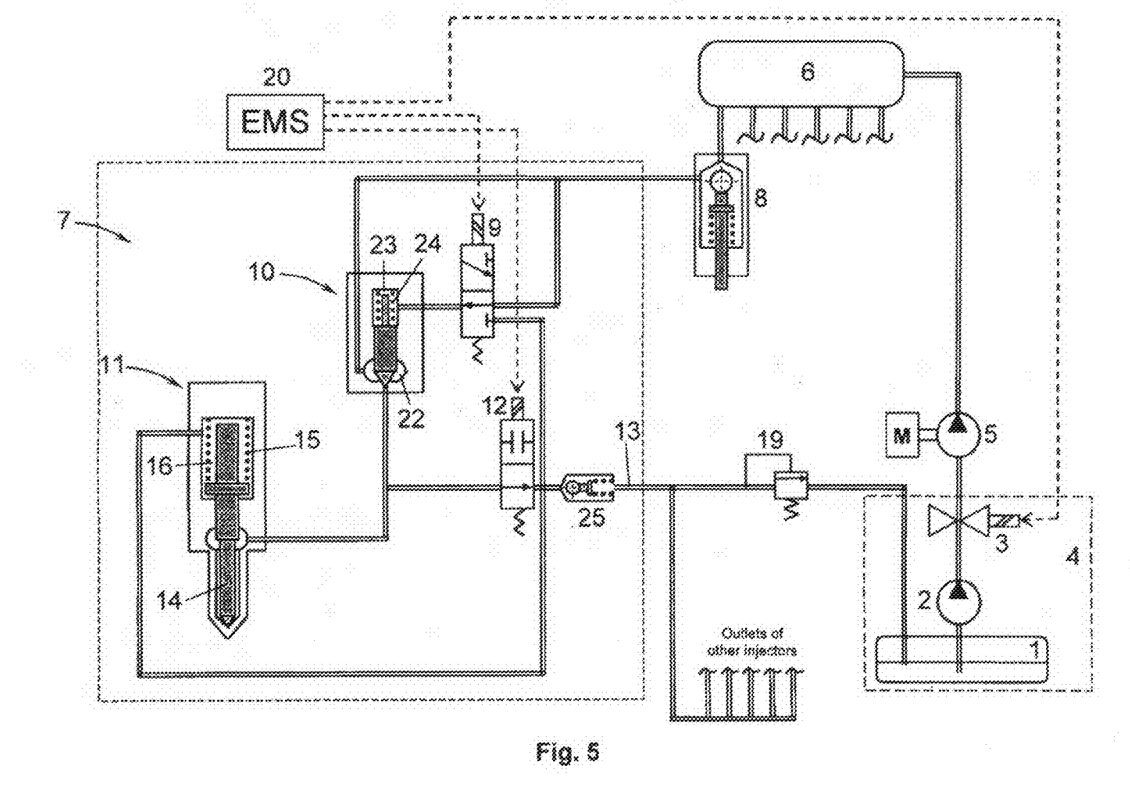
FIG. 5 shows a schematic illustration of a fourth example embodiment of a fuel injection system according to the present invention.
Figure 6:
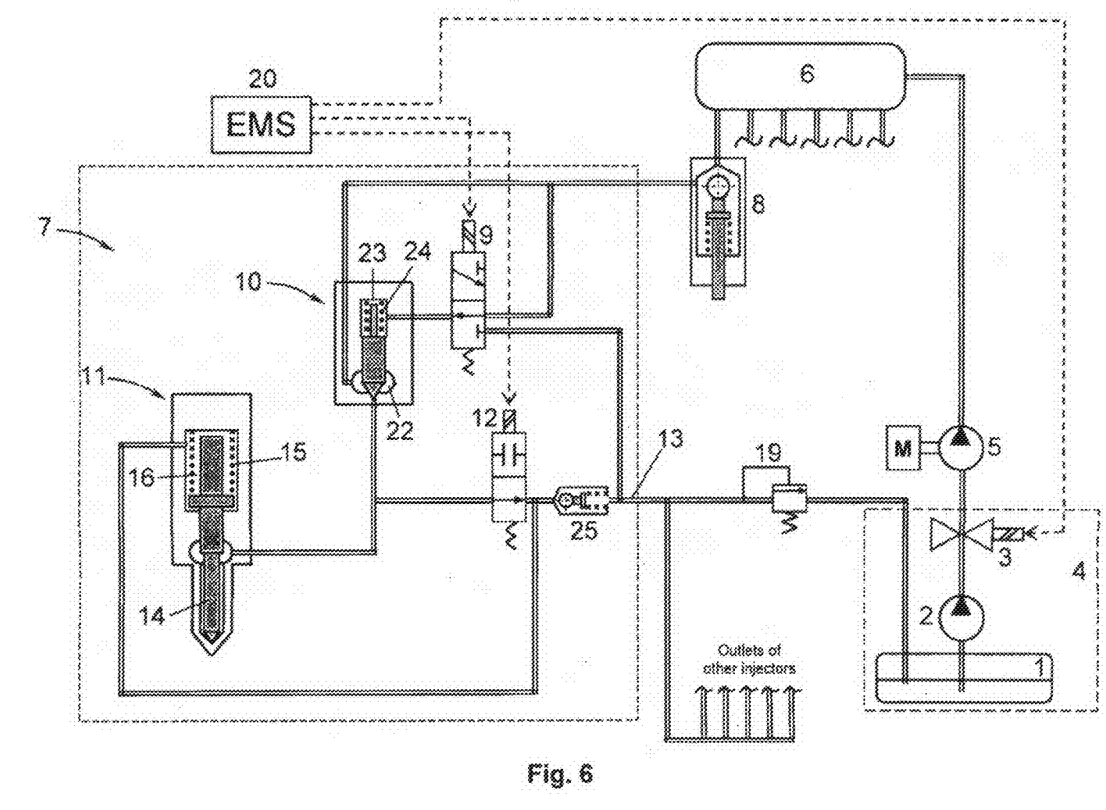
FIG. 6 shows a schematic illustration of a fifth example embodiment of a fuel injection system according to the present invention.
Figure 7:
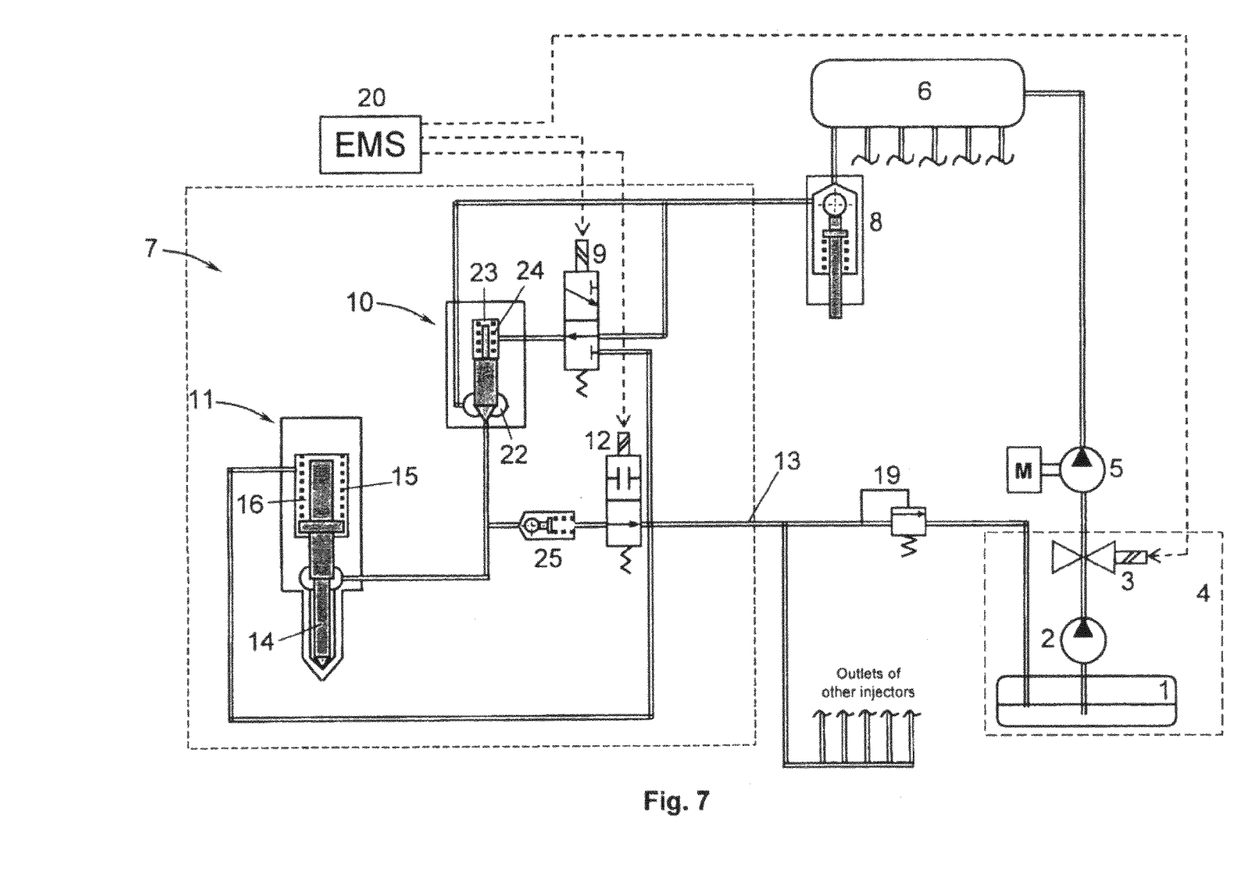
FIG. 7 shows a schematic illustration of a sixth example embodiment of a fuel injection system according to the present invention.

Connecting the outlet of the pilot valve 9 to the upstream side of the spill valve 12, whilst reducing the required flow capacity of the check valve 25 as described above, may slow down the rate of the opening of the HOV 10 in the beginning of injection as compared to systems where the outlet of the pilot valve 9 is connected downstream of the spill valve. An alternative embodiment of the present invention shown in FIG. 5 is designed to combine the protection against the leakage by the check valve 25 with a faster-opening HOV 10. The faster HOV opening is achieved by connecting the outlet of the pilot valve 9 to downstream of spill valve 12. In that embodiment of the invention, the check valve 25 still protects against leakage from the low-pressure system through the closed pilot valve and the guide of the HOV pin into the nozzle 11, but has to be able to pass slightly higher flow which may negatively impact its durability due to increased size and/or weight of the moving parts. A combination of a faster-opening HOV with a lower-flow check valve 25 is offered by another alternative embodiment of the invention shown in FIG. 6, in which the outlet of the pilot valve 9 is connected downstream of the spill valve 12 and also downstream of check valve 25. In yet another embodiment shown in FIG. 7, a smaller isolated volume in combination with a low-flow check valve 25 and a faster-opening HOV are achieved, because the check valve is placed upstream of the spill valve 12 while the outlet of the pilot valve 9 is connected downstream of spill valve.

Figure 8:
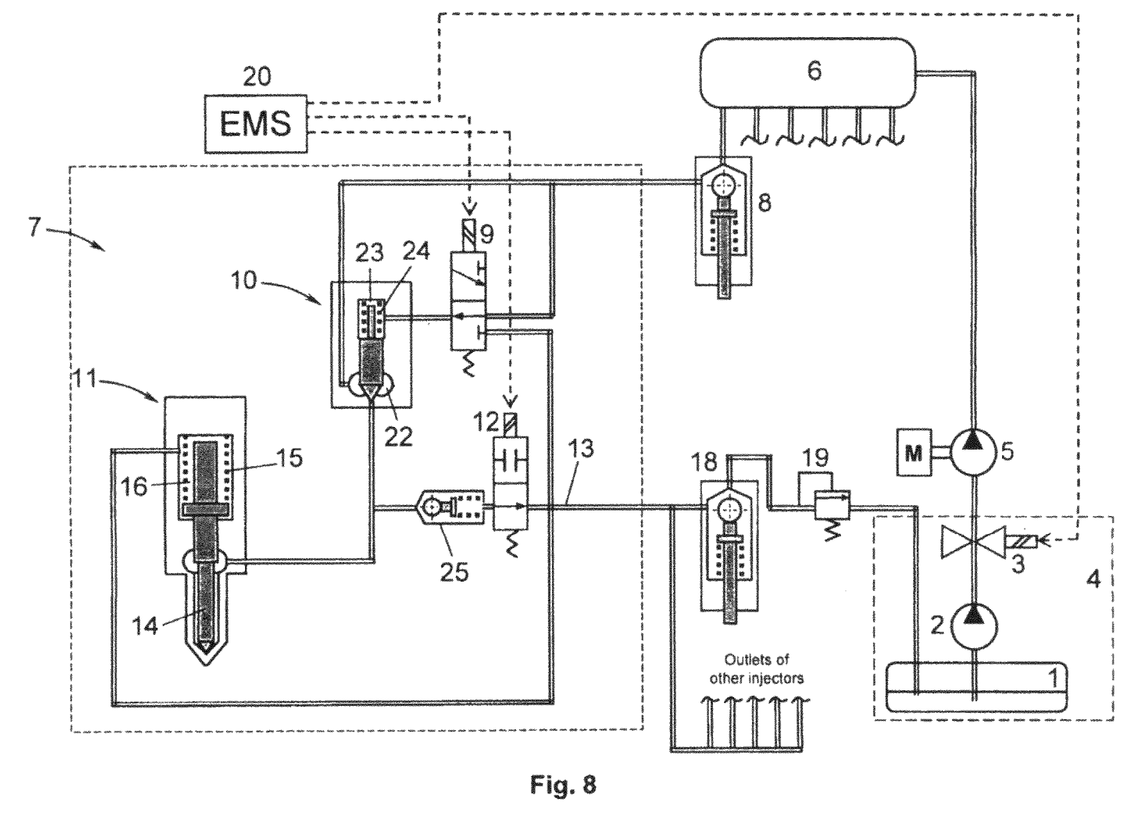
FIG. 8 shows a schematic illustration of a seventh example embodiment of a fuel injection system according to the present invention.

An additional automatic isolating valve at an injector return line can also be employed in the present invention, as shown, for example, in FIG. 8. In that embodiment, AIV 18 will protect against leakage from the low-pressure system past the guides of the nozzle 11 and the HOV 10, as well as ensure leakage reduction in case of a failure of a check valve 25.

The check valve is designed to have a relatively small maximum flow area, typically 0.1 mm2, making it possible to use relatively small and therefore lightweight moving parts and a slow rate of closing the valve and by these means achieve reliable operation over great number of injector working cycles.

Placing the check valve upstream of the spill valve as described allows for the direct connection of injector's return line to the low-pressure fuel supply system. That reduces the total number of necessary AIVs in the fuel injection system and by this means achieves its simplification.

As known in the art, the bigger the required flow area of a valve and, in this particular application, a check valve, the higher the forces and the faster the required response time, the more difficult it is to achieve long and leakage-free service life of the valve due to wearing out of the mating seats. In the present invention, all pre-requisites for reliable operation of the check valve installed between the high-pressure volumes and the return line of the injector for prevention of backflow from the former to the latter, do generally exist: firstly, the valve does not need to be fast-acting to shut after each and every injection; secondly, the negative pressure drop that assists in closing the valve and largely defines contact pressure in the seats, is actually never present until the valve is closed and pressure upstream of the valve is relieved below its downstream pressure; and thirdly, the flow that needs to pass the valve out to the return line, is relatively small.

In the prior art, the flow out to return line is largely made of the volume displaced by the hydraulically operated valve upon its opening, the control leakage in the pilot valve, and the decompression volume that is released when the pressure between the nozzle and the HOV is relieved. In such a system, a typical return line flow could be as low as 1/30 of the injected volume at full load conditions of the engine. The present invention can be configured to reduce the total leakage volume even further and by this means allow the use of an even smaller check valve, thus contributing to its better durability. The reduction of the total leakage volume in the present invention is due to the relieving of the pressure from the back of the HOV through the pilot valve to the downstream of HOV and further into combustion chamber, rather than out through the return line in case of the prior art in which the outlet of the pilot valve is connected to the outlet of the spill valve.

It is to be understood that the present invention is not limited to the embodiments described above and illustrated in the drawings; rather, the skilled person will recognize that many changes and modifications may be made within the scope of the appended claims.

The invention claimed is:

1. A fuel injection system for an internal combustion engine, comprising
an engine management system (EMS),
a return line connected to a low-pressure fuel system,
a common rail for storing and supplying a relatively high-pressure fuel to an injector, the injector having a nozzle for injecting fuel into the engine,
a valve operated by the EMS and installed between the common rail and the nozzle,
a spill valve operated by the EN-IS and connected by its inlet to an outlet of the valve and by its outlet to the return line, and
a check valve is provided between the nozzle and the return line, wherein the inlet of the check valve is connected to the inlet of the nozzle.

2. The fuel injection system according to claim 1, wherein the check valve is connected by its inlet to the outlet of the spill valve.

3. The fuel injection system according to claim 1, wherein the valve is electrically operated by the EMS.

4. The fuel injection system according to claim 1 the, wherein the valve is controlled by an electrically operated pilot valve, the outlet of the pilot valve being connected to the outlet of the spill valve.

5. The fuel injection system according to claim 2, wherein the valve is controlled by an electrically operated pilot valve, the outlet of the pilot valve being connected to the outlet of the check valve.

6. The fuel injection system according to claim 1, wherein the nozzle has a needle which is biased towards dosing the nozzle by a force of pressure in a spring chamber, and that the spring chamber is connected to the outlet of the spill valve.

7. The fuel injection system according, to claim 1, wherein the nozzle has a needle which is biased towards closing the nozzle by a force of pressure in a spring chamber, and that the spring chamber is connected to the return line.

8. The fuel injection system to claim 1 the, wherein an automatic isolating valve is installed between the return line and the low-pressure system.

9. The fuel injection system according to claim 1, wherein a pressure regulator is installed between the return line and the low-pressure system.

10. The fuel injection system according to claim 8, wherein a pressure regulator is installed between the automatic isolating valve and the low-pressure system.

11. The fuel injection system according to claim 1, wherein an isolating valve is installed between the common rail and the injector.

12. A vehicle comprising, a fuel injection system according to claim 1.

13. The fuel injection system according to claim 1, comprising a plurality of injectors connected to the common rail.

14. The fuel injection system according to claim 1, wherein the inlet of the check valve is connected to the inlet of the nozzle either directly or via the spill valve.

15. A fuel injection system for an internal combustion engine, comprising
- an engine management system (EMS),
- a return line connected to a low-pressure fuel system,
- a common rail for storing and supplying a relatively high-pressure fuel to an injector, the injector having a nozzle for injecting fuel into the engine,
- a valve installed between the common rail and the nozzle and controlled by an electrically operated pilot valve,
- an electrically operated spill valve connected by its inlet to the outlet of the valve and by its outlet to the return line, wherein the outlet of the pilot valve is connected to the outlet of the valve.

16. The fuel injection system according to claim 15, wherein a check valve is installed between the nozzle and the return line, an inlet of the check valve being connected to an inlet of the nozzle.

17. The fuel injection system according to claim 15, wherein a check valve is installed between the nozzle and the return line, an inlet of the check valve being connected to an outlet of the spill valve.

18. The fuel injection system according to claim 15, comprising a plurality of injectors connected to the common rail.

* * * * *